(12) United States Patent
Kruger et al.

(10) Patent No.: US 8,039,139 B2
(45) Date of Patent: Oct. 18, 2011

(54) PRISMATIC-CELL BATTERY PACK WITH INTEGRAL COOLANT PASSAGES

(75) Inventors: Duane D. Kruger, Westfield, IN (US); Robert C. Beer, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 1 day.

(21) Appl. No.: 12/611,168

(22) Filed: Nov. 3, 2009

(65) Prior Publication Data

US 2010/0143782 A1 Jun. 10, 2010

(51) Int. Cl.
*H01M 10/50* (2006.01)
(52) U.S. Cl. ........................................ 429/120
(58) Field of Classification Search ............... 429/120
See application file for complete search history.

(56) References Cited

U.S. PATENT DOCUMENTS

2006/0234119 A1  10/2006  Kruger et al.
2010/0285346 A1*  11/2010  Graban et al. ............... 429/120
* cited by examiner

*Primary Examiner* — Karie O'Neill Apicella
(74) *Attorney, Agent, or Firm* — Jimmy L. Funke

(57) ABSTRACT

A prismatic-cell battery pack is provided with integral coolant passages including an intake plenum, an exhaust plenum, and a distributed array of coolant channels coupled between the intake plenum and the exhaust plenum. Coolant medium forced into the intake plenum enters the coolant channels in parallel, draws heat away from the battery cells, and then enters the exhaust plenum for expulsion into the atmosphere. The battery pack is configured as a set of stackable interlocking battery cell modules including at least one battery cell in thermal proximity to an array of coolant channels distributed over the profile of the battery cell, and a pair of peripheral chambers joined to opposite ends of the coolant channels to form the intake and exhaust plenums when the modules are arranged and interlocked in a lineal stack.

7 Claims, 4 Drawing Sheets

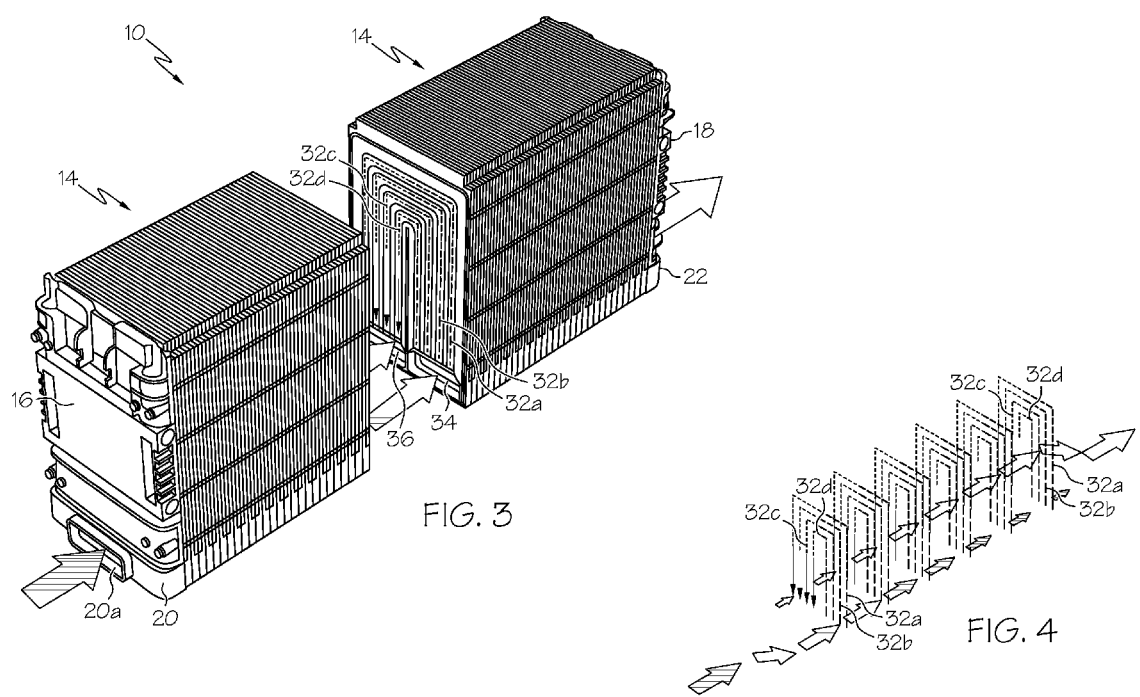

PRISMATIC-CELL BATTERY PACK WITH INTEGRAL COOLANT PASSAGES

TECHNICAL FIELD

The present invention relates to a high-voltage battery pack containing prismatic battery cells arranged a lineal stack, and more particularly to prismatic-cell battery pack with integral coolant passages for forced-air cooling of the battery cells.

BACKGROUND OF THE INVENTION

High voltage battery packs can be configured for efficient space utilization by stacking and co-packaging battery cells of a prismatic (i.e., rectangular) form factor. The prismatic cells are typically arranged so that their terminals are all accessible from the top of the pack, and the terminals of adjacent cells lie in close proximity for convenient interconnection due to the thin profile of the cells. Lithium-ion batteries are well-suited to such applications because of their low weight, high power density and relatively high cell voltage, and because they can be produced at relatively low cost in prismatic form, particularly when encapsulated by a soft package of metalized plastic film instead of a rigid plastic or metal case. When soft-package cells are used, they can be conveniently mounted in stackable rigid plastic frames, as shown for example, in the U.S. Patent Publication No. 2006/01232119. Also, foam pads can be used for cell-to-cell isolation and to compressively support the cells.

A serious challenge involved in the design of a battery pack is the provision of adequate cooling for the individual cells. This is particularly true in hybrid vehicle and other applications that require the battery pack to supply large amounts of energy at a high rate. The usual approach is to attach one or more liquid-cooled or air-cooled heatsinks to the bottom and/or sides of the battery pack, and to use metal heat runners to transfer heat from the battery cells to the heatsinks by conduction. While this approach can be effective if sufficient space is available to accommodate the heatsinks, space and weight considerations often take precedence, forcing sub-optimal sizing and placement of the heatsinks. Moreover, the effectiveness of this approach is hampered for two additional reasons: first, the heat produced in a battery cell is greatest near its terminals, which may be separated from the heatsinks by a substantial distance; and second, the cooling medium rises in temperature as it travels through the heatsink, which degrades heat rejection capability at the downstream end of the heatsink. And since over-heating can permanently damage a battery cell, the power output of the battery pack often has to be limited to preserve battery pack life expectancy. Accordingly, what is needed is a way of more effectively and uniformly cooling a prismatic-cell battery pack so that its life and performance will not be heat-limited.

SUMMARY OF THE INVENTION

The present invention is directed to an improved prismatic-cell battery pack having integral coolant passages including an intake plenum, an exhaust plenum, and a distributed array of coolant channels coupled between the intake plenum and the exhaust plenum. A coolant medium such as air is forced into the intake plenum, enters the various coolant channels in parallel, draws heat away from the battery cells, and then enters the exhaust plenum and is expelled into the atmosphere.

The improved battery pack is conveniently configured as a set of stackable interlocking battery cell modules, where each module supports at least one prismatic battery cell in thermal proximity to an array of coolant channels distributed over the profile of the battery cell. Each battery cell module also includes a pair of peripheral chambers joined to opposite ends of the coolant channels to form the intake and exhaust plenums when the modules are arranged and interlocked in a lineal stack. In a preferred mechanization, the intake and exhaust plenums are disposed below the battery cells, and the coolant channels are in the shape of an inverted-U, conducting coolant from the intake plenum upward toward the battery cell terminals and then back downward to enter the exhaust plenum.

BRIEF DESCRIPTION OF THE DRAWINGS

FIG. 3 is a partially sectioned isometric view of the battery pack of FIG. 1, illustrating coolant flow through a representative battery cell module.

FIG. 4 is an abbreviated coolant flow diagram for the battery pack of FIG. 1.

DESCRIPTION OF THE PREFERRED EMBODIMENT

Figure 1:
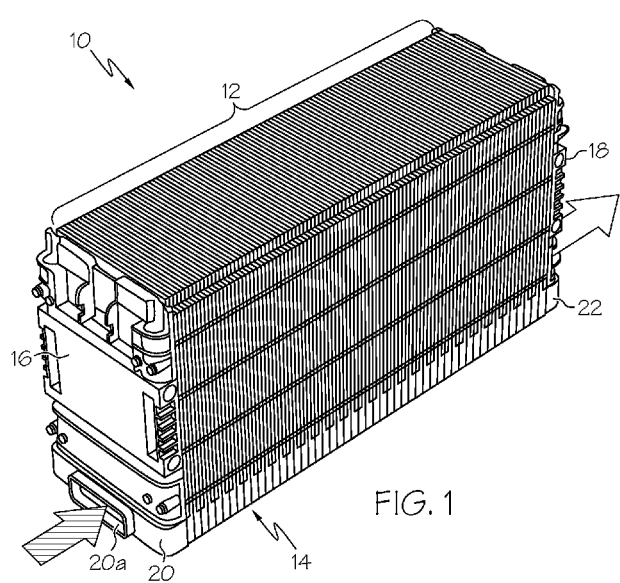
FIG. 1 is an isometric view of a prismatic-cell battery pack according to this invention.
Figure 2:
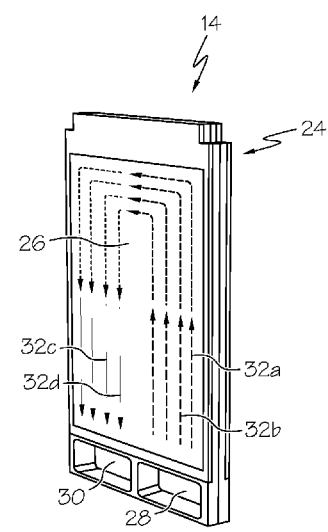
FIG. 2 is an isometric view of a battery cell module of the battery pack of FIG. 1.

Referring to the drawings, and particularly to FIGS. 1-3, the reference numeral 10 generally designates prismatic-cell battery pack according to this invention. In general, the battery pack 10 includes a lineal stack 12 of battery cell modules 14 longitudinally bounded by first and second end pieces 16 and 18, an inlet end cap 20, and an outlet end cap 22. Referring particularly to FIG. 2, each of the battery cell modules 14 includes a set of interlocking frames 24 for supporting and retaining a pair of prismatic battery cells 26 (only one of which is shown in FIG. 2), and for channeling coolant in proximity to the battery cells 26. The battery cells 26 are preferably soft-package cells, and a pad of resilient material such as open-cell foam (not shown) is inserted between each of the battery cell modules 14 of the stack 12 to support and compressively load the non-marginal portions of the battery cells 26. The battery pack elements may be held in place, for example, by a set of fasteners routed through suitable openings (not shown) in the modules 14 and end pieces 16, 18.

Figure 5:
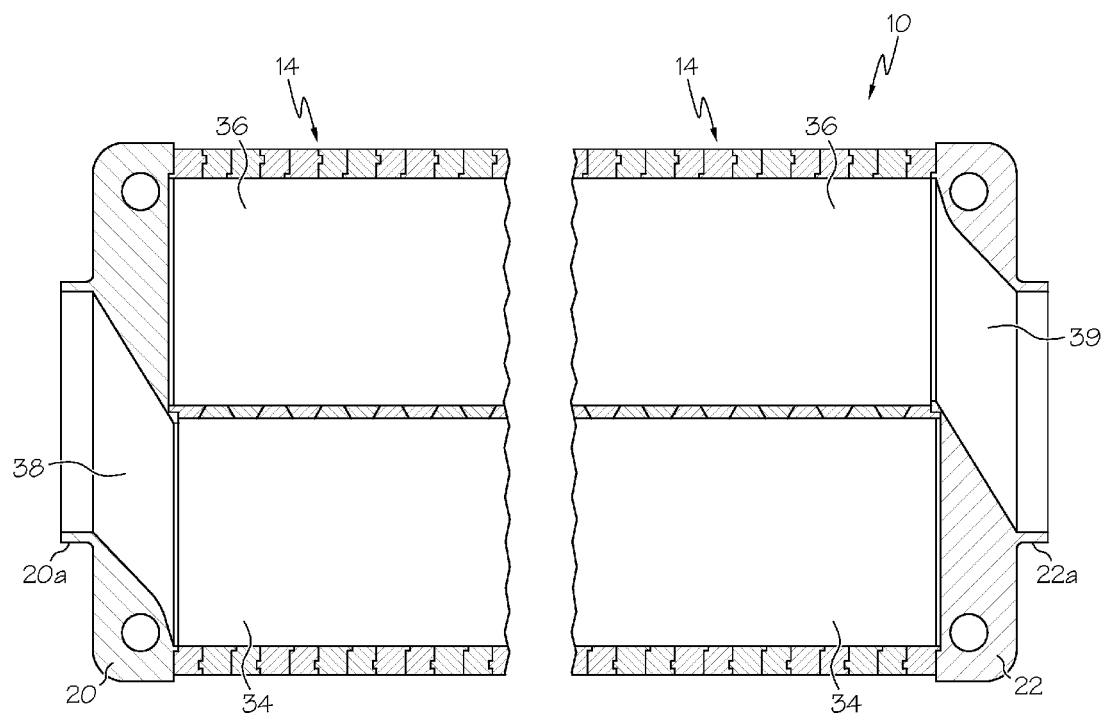
FIG. 5 is a partial cross-sectional view illustrating inlet and outlet end caps for the battery pack of FIG. 1.

Referring to FIG. 2, each of the battery cell modules 14 includes a set of coolant passages, including an intake chamber 28, an exhaust chamber 30, and several U-shaped coolant channels 32a, 32b, 32c, 32d (as represented by phantom flow lines) that couple the intake chamber 28 to the exhaust chamber 30. When the battery cell modules 14 are arranged and interlocked in a lineal stack as shown in FIGS. 1 and 3, the various intake chambers 28 axially align to form an intake plenum 34 that extends the length of the stack 12, and the various exhaust chambers 30 similarly align to form an exhaust plenum 36 that also extends the length of the stack 12. As illustrated in FIG. 5, the coolant inlet cap 20 blocks the exhaust plenum 36 but establishes an airway 38 between intake plenum 34 and an inlet port 20a formed in the coolant inlet cap 20. Conversely, the coolant outlet cap 22 blocks the intake plenum 34 but establishes an airway 39 between exhaust plenum 36 and an outlet port 22a formed in the coolant outlet cap 22. Accordingly, and as illustrated in the coolant flow diagram of FIG. 4, coolant (forced air, for example) entering inlet port 20a is directed into the intake plenum 34, through the U-shaped coolant channels 32a-32d in each of the stacked battery cell modules 14, into the exhaust plenum 36, and is expelled from the outlet port 22a.

The temperature of the coolant entering each of the battery cell modules 14 is essentially the same because each module 14 receives coolant from the intake plenum 34, as opposed to coolant that has already passed through another module 14 of the pack 10. As a result, the cooling performance is substantially equivalent for each battery cell module 14 of the pack 10. Additionally, the U-shaped coolant channels 32a-32d traverse substantially the entire surface area of the respective battery cells 26 to prevent any battery cell hot-spots, particularly in the region of the battery terminals where much of the battery cell heat is generated. While the temperature of the coolant will obviously rise as it traverses the U-shaped coolant channels 32a-32d, the coolant flow can be controlled to provide sufficient cooling to the battery cell portions adjacent the downstream ends of the coolant channels 32a-32d. Also, the coolant channels 32a, 32b, 32c, 32d in a given battery call module 14 can vary in width to achieve a desired coolant flow distribution for optimal cooling performance.

Figure 6:
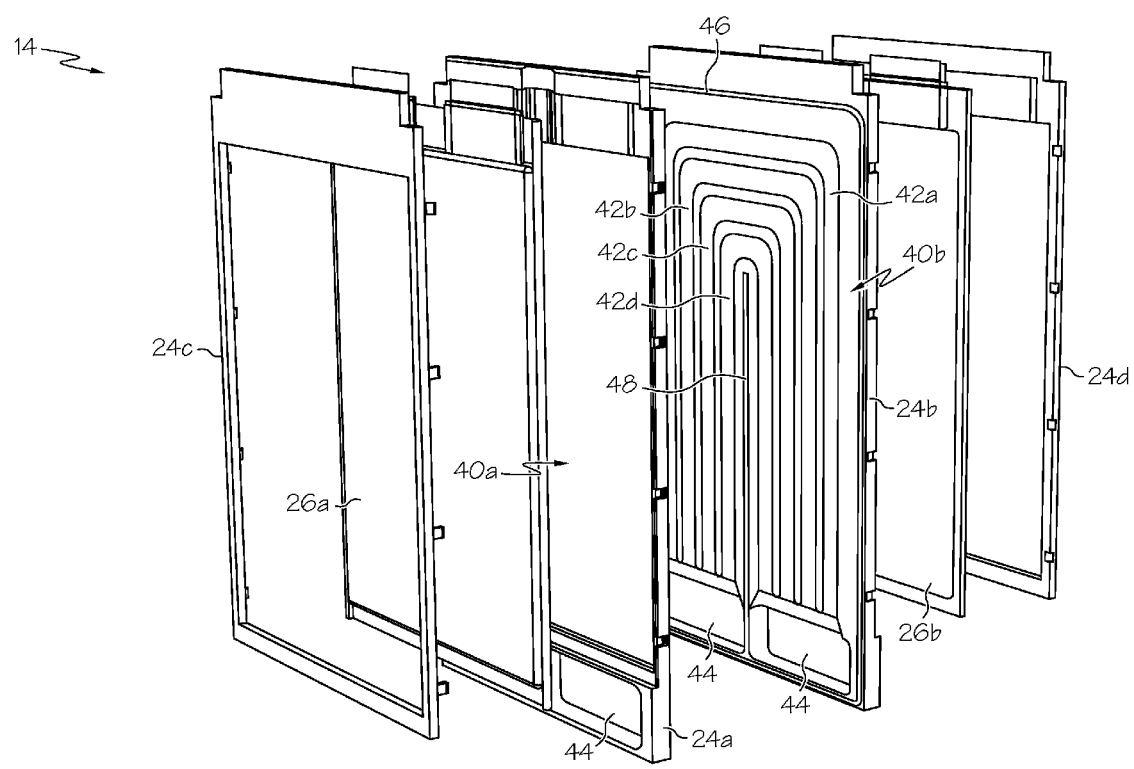
FIG. 6 is an exploded isometric view of the battery cell module of FIG. 2.

Referring to FIG. 6, each of the battery cell modules 14 is constructed as an assembly of two prismatic battery cells 26a, 26b and a set of four interlocking frame members 24a-24d. The two inner frame members 24a and 24b are identical, as are the two outer frame members 24c and 24d. Although not shown in FIG. 6, the modules 14 also include a provision for suitably interconnecting the battery cell terminals 48a, 48b, 48c, 48d, and the battery cells 26a, 26b may be placed in an orientation that facilitates the desired series or parallel battery terminal interconnection.

The two inner frame members 24a and 24b each have a planar outboard face 40a and sculpted inboard face 40b. When they are arranged as shown in FIG. 6 and mutually joined, the outboard faces 40a provide smooth support surfaces for the battery cells 26a and 26b, and the sculpted inboard faces 40b form the U-shaped coolant channels 32a-32d. Specifically, the coolant channels 32a, 32b, 32c, 32d are formed by a set of nested U-shaped recesses 42a, 42b, 42c, 42d on the inboard face 40b of each inner frame member 24a, 24b. The opposed recesses 42a-42d on the inboard faces 40b of frame members 24a and 24b abut when the frame members 24a and 24b are joined, thereby forming the U-shaped coolant channels 32a-32d. The inner frame members 24a, 24b also include lower openings or apertures 44 that align as indicated to form the intake and exhaust chambers 28 and 30 mentioned above in reference to FIG. 2. The recesses 42a-42d open at one end into the openings 44 that form the intake chamber 28, and at the other end into the openings 44 that form the exhaust chamber 30, to produce the coolant flow illustrated in FIG. 4 when coolant is supplied to the inlet port 20a. A tongue-in-groove seal 46 near the periphery of the inner frame members 24a, 24b prevents coolant leaks to atmosphere; and a tongue-in-groove seal 48 in a central portion of the inner frame members 24a, 24b prevents coolant leakage between intake and exhaust plenums 34, 36. It is expected that some coolant leakage between adjacent coolant channels 32a-32d may occur, but any such leakage will be both minor and inconsequential.

The battery cells 26a, 26b are maintained in contact with the smooth and planar outboard faces 40 of the inner frame members 24a, 24b, and the coolant in coolant channels 32a-32d is only separated from the battery cells 26a, 26b by the local thickness of the respective inner frame member 24a or 24b, which may be on the order of 1 mm or less. Accordingly, heat produced by the battery cells 26a, 26b is quickly and efficiently transferred to the coolant flowing in coolant channels 32a-32d, even if the inner frame members 24a, 24b are constructed of a material such as plastic. Of course, the inner frame members 24a, 24b could be constructed of a material exhibiting high thermal conductivity if desired. Also, it is possible to utilize an insulative material such as plastic for the marginal portions of inner frame members 24a, 24b, and a conductive material such as aluminum for the non-marginal portions of inner frame members 24a, 24b.

The two outer frame members 24c and 24d fasten to the inner frame members 24a and 24b, respectively, to retain the prismatic battery cells 26a and 26b in the module 14. In effect, the terminal and marginal portions of each battery cell 26a, 26b are sandwiched between an inner frame member 24a, 24b and an outer frame member 24c, 24d. And the inter-module foam pads, mentioned above in respect to FIG. 1, press against the exposed non-marginal portions of the battery cells 26a and 26b to maintain them in abutment with the exterior surfaces 40 of the inner frame members 24a and 24b.

In summary, present invention provides an effective and low-cost packaging arrangement for efficiently and uniformly cooling a prismatic-cell battery pack with a flow-through coolant. Integrating the coolant channels 32a-32d and plenums 34, 36 into the frames 24a, 24b that support the cells 26 of the battery pack 10 contributes to low overall cost, and ensures that the coolant will uniformly cool each of the cells 26. The use of identical parts in reverse orientation (for example, the inlet and outlet end caps 20, 22, the inner frame members 24a, 24b, and the outer frame members 24c, 24d) also contributes to low overall cost of the battery pack 10.

While the present invention has been described with respect to the illustrated embodiment, it is recognized that numerous modifications and variations in addition to those mentioned herein will occur to those skilled in the art. For example, the number of coolant channels 32a-32d in a battery cell module 14 may be different than shown, as may the number of battery cells 26 in a battery cell module 14, and so on. Accordingly, it is intended that the invention not be limited to the disclosed embodiment, but that it have the full scope permitted by the language of the following claims.

The invention claimed is:

1. A prismatic-cell battery pack, comprising:
a set of battery cell modules arranged and interlocked in a lineal stack, each battery cell module including at least one prismatic battery cell supported in thermal contact with a plurality of coolant channels distributed over a surface of the battery cell, and a pair of peripheral chambers joined to opposite ends of the coolant channels to form intake and exhaust plenums respectively upstream and downstream of said coolant channels when the modules are lineally arranged and interlocked, whereby coolant supplied to the intake plenum enters the coolant channels of each module in parallel, cools the respective battery cells, and is returned to the exhaust plenum for expulsion from the battery pack.

2. The prismatic-cell battery pack of claim 1, where:
the intake and exhaust plenums are disposed near a first end of the battery cell, and the coolant channels of each module conduct coolant from the intake plenum toward a second end of the battery cell and then back into the exhaust plenum.

3. The prismatic-cell battery pack of claim 1, further comprising:

a coolant inlet cap that blocks the exhaust plenum but establishes a coolant inlet airway between the intake plenum and an inlet port formed in the coolant inlet cap; and a coolant outlet cap that blocks the intake plenum but establishes a coolant outlet airway between the exhaust plenum and an outlet port formed in the coolant outlet cap.

4. The prismatic-cell battery pack of claim 1, where said battery cell modules comprise:

first and second prismatic battery cells; and first and second mutually joined inner frame members having sculpted inboard faces that form said plurality of coolant channels, and planar outboard faces that are thermally coupled to said first and second battery cells.

5. The prismatic-cell battery pack of claim 4, where:

said first and second inner frame members have peripheral openings that form said pair of peripheral chambers.

6. The prismatic-cell battery pack of claim 5, further comprising:

a peripheral seal between said first and second inner frame members to prevent coolant leakage from said plurality of coolant channels and said peripheral chambers.

7. The prismatic-cell battery pack of claim 4, further comprising:

a seal between said first and second inner frame members to prevent coolant leakage between said pair of peripheral chambers.

* * * * *